United States Patent
Zukerman et al.

(10) Patent No.: US 11,853,916 B2
(45) Date of Patent: Dec. 26, 2023

(54) SYSTEM AND METHOD FOR DETERMINING OPTIMAL PATH ARRANGEMENTS FOR AN INFRASTRUCTURE LINK WITH TWO OR MORE DESIGN LEVELS

(71) Applicant: City University of Hong Kong, Kowloon (HK)

(72) Inventors: Moshe Zukerman, Kowloon (HK); Zengfu Wang, Shaanxi (CN); Qing Wang, Kowloon (HK); Bill Moran, Kowloon (HK); Elias Tahchi, Quarry Bay (HK)

(73) Assignee: City Universtiy of Hong Kong, Kowloon (HK)

( * ) Notice: Subject to any disclaimer, the term of this patent is extended or adjusted under 35 U.S.C. 154(b) by 597 days.

(21) Appl. No.: 15/992,480

(22) Filed: May 30, 2018

(65) Prior Publication Data
US 2019/0370711 A1    Dec. 5, 2019

(51) Int. Cl.
*G06Q 10/0631* (2023.01)
*G06F 30/20* (2020.01)
(Continued)

(52) U.S. Cl.
CPC ....... *G06Q 10/06313* (2013.01); *G06F 30/20* (2020.01); *G01V 99/005* (2013.01); *H02G 1/06* (2013.01)

(58) Field of Classification Search
None
See application file for complete search history.

(56) References Cited

U.S. PATENT DOCUMENTS

2006/0020431 A1*  1/2006  Gipps ............... G06Q 10/047
                                                       703/1
2011/0270793 A1* 11/2011  Bertogg ............ G06Q 40/06
                                                       706/50
(Continued)

FOREIGN PATENT DOCUMENTS

CN        107767052 A  *  3/2018

OTHER PUBLICATIONS

Cao, C., Wang, Z., Zukerman, M., Manton, J. H., Bensoussan, A., & Wang, Y., Optimal Cable Laying Across an Earthquake Fault Line Considering Elliptical Failures, (2016), IEEE Transactions on Reliability, 65(3), 1536-1550. (Year: 2016).*
(Continued)

*Primary Examiner* — Sara Grace Brown
(74) *Attorney, Agent, or Firm* — RENNER KENNER GREIVE BOBAK TAYLOR & WEBER

(57) ABSTRACT

A method for determining optimal path arrangements for an infrastructure link between two geographic locations. The method includes modelling a geographic terrain containing the two geographic locations; optimizing an arrangement cost and a repair rate for two or more potential paths based on the modelled geographic terrain, an arrangement cost model, and a repair rate model, taking into account at least two design levels; and determining the optimal path arrangements each including multiple path portions and respective design levels associated with the path portions based on the optimization.

13 Claims, 15 Drawing Sheets
(13 of 15 Drawing Sheet(s) Filed in Color)

(51) Int. Cl.
*H02G 1/06* (2006.01)
*G01V 99/00* (2009.01)

(56) References Cited

U.S. PATENT DOCUMENTS

| | | | | |
|---|---|---|---|---|
| 2012/0274440 | A1* | 11/2012 | Meadows | G01V 1/008 340/3.42 |
| 2013/0338984 | A1* | 12/2013 | Braaksma | G01V 11/00 703/10 |
| 2016/0358697 | A1* | 12/2016 | Soerensen | H01B 13/26 |
| 2017/0003694 | A1* | 1/2017 | Carvajal | E21B 43/30 |
| 2017/0154130 | A1* | 6/2017 | Dewell | G06F 30/00 |
| 2019/0012408 | A1* | 1/2019 | Forbes | H02J 3/00 |
| 2019/0137639 | A1* | 5/2019 | Walsh, III | G06N 7/005 |
| 2019/0237217 | A1* | 8/2019 | Shroll | H01B 7/14 |
| 2019/0266674 | A1* | 8/2019 | Kownacki | G06Q 50/26 |

OTHER PUBLICATIONS

Kongar, I., Giovinazzi, S., Rossetto, T., Seismic performance of buried electrical cables: evidence-based repair rates and fragility functions, 2017, Bull Earthquake Eng (2017) 15:3151-3181 DOI 10.1007/s10518-016-0077-3 (Year: 2017).*
Msongaleli, D., Dikbiyik, F., Zukerman, M., Mukherjee, B.; Disaster-Aware Submarine Fiber-Optic Cable Deployment for Mesh Networks, (Sep. 15, 2016), Journal of Lightwave Technology, vol. 34, No. 18 (Year: 2016).*
Shen, Z., Vladimirsky, A.; Piecewise-Deterministic Optimal Path-Planning; (Dec. 29, 2015), Center for Applied Mathematics and Department of Mathematics Cornell University (Year: 2015).*
Tran, P., Saito, H., "Geographical Route Design of Physical Networks Using Earthquake Risk Information," (Jul. 2016), Network and Service Management (Year: 2016).*
Kaul, Vivek, Anthony Yezzi, and Yichang Tsai. "Detecting curves with unknown endpoints and arbitrary topology using minimal paths." 2011. IEEE Transactions on Pattern Analysis and Machine Intelligence 34.10: 1952-1965. (Year: 2011).*
Zhao, Mingbo, et al. "Route selection for cabling considering cost minimization and earthquake survivability via a semi-supervised probabilistic model." (2016) IEEE Transactions on Industrial Informatics 13.2: 502-511. (Year: 2016).*
Worzyk, Thomas. "Submarine power cables. Design, installation, repair, environmental aspects." (2009). (Year: 2009).*
Zukerman, Moshe. Considering Cost and Network Survivability in Laying Telecommunications Cables, Mar. 15, 2016 (Year: 2016).*
Jim Attwood, "Cable Design for Subsea Power Links," 2000, IEEE Power Engineering Review 20.9: 13-14 (Year: 2000).*
Ventikos, N. P., and D. I. Stavrou. "Submarine power cables: Laying procedure, the fleet and reliability analysis." 2013. Journal of Marine Engineering & Technology 12.1: 13-26. (Year: 2013).*
Kopsidas, Konstantinos, and Shuran Liu. "Power network reliability framework for integrating cable design and ageing." 2017. IEEE Transactions on Power Systems 33.2: 1521-1532. (Year: 2017).*
Jurdana, I., and B. Mikac. "Impact of physical layer configuration on availability of path protected optical fibre transmission network." Proceedings of the 11th International Conference on Telecommunications. IEEE, 2011. (Year: 2011).*
Z. Wang et al, "A Seismic Resistant Design Algorithm for Laying and Shielding of Optical Fiber Cables", IEEE/OSA Journal of Lightwave Technology, val. 35, No. 14, pp. 3060-3074, Jul. 2017.

* cited by examiner

SYSTEM AND METHOD FOR DETERMINING OPTIMAL PATH ARRANGEMENTS FOR AN INFRASTRUCTURE LINK WITH TWO OR MORE DESIGN LEVELS

TECHNICAL FIELD

The present invention relates to a system and method for determining optimal path arrangements for an infrastructure link. More particularly, although not exclusively, the invention relates to a system and method for determining one or more optimal paths for laying a long-haul optical fiber cable between two locations on the Earth's surface, taking into account at least two design levels.

BACKGROUND

Optical fiber long-haul telecommunication cables are crucial to modern society in transmitting information to supply burgeoning demand in the increasingly interconnected world. On one hand, investments in long-haul optical fiber cables have a significant impact on the economy; on the other hand, breakage or faults of such cables caused by various hazards such as earthquakes can lead to severe social and economic consequences. It is therefore preferable to incorporate disaster mitigation into the cable route planning and design phase with the aim of avoiding such problems ab initio.

In view of the high cost involved, it is desirable to improve the survivability of the cables. One way is to keep the cables at a safe distance away from high risk regions, which results in longer cables. Another way is to strengthen the cables with special shielding, or armoured components when the cable passes through high risk areas. Examples of strengthened cables include single armoured cable, double armoured cable and rock armoured cable, with an increasing protection level. However, a higher protection level requires a more expensive material, this results in higher construction cost per unit cable length.

SUMMARY OF THE INVENTION

In the light of the foregoing background, it is an object to address the above needs, to overcome or substantially ameliorate the above disadvantages or, more generally, to provide a system and method for determining optimal path arrangements for an infrastructure link.

Accordingly, the present invention, in a first aspect, provides a method for determining optimal path arrangements for an infrastructure link between two geographic locations, comprising modelling a geographic terrain containing the two geographic locations; optimizing an arrangement cost and a repair rate for two or more potential paths based on the modelled geographic terrain, an arrangement cost model, and a repair rate model, taking into account at least two design levels; and determining the optimal path arrangements each including multiple path portions and respective design levels associated with the path portions based on the optimization.

Preferably, the optimization is independent of directionality of the path arrangements.

Preferably, the modelling of the geographic terrain comprises modelling the geographic terrain into a grid with multiple grid points.

Preferably, the geographic terrain is modelled such that each point on the model is denoted by a 3D coordinate including altitude of the geographic location.

More preferably, the method further comprises receiving input associated with dimensions of the grid points for modelling the geographic terrain.

Additionally, the method further comprises receiving input associated with the two geographic locations.

Additionally, the method further comprises displaying at least one of the optimized path arrangements on a map of the geographic terrain.

Preferably, the arrangement cost model incorporates a factor associated with location and design level of the path.

More preferably, the factor includes: local geographic attributes, labor, licenses, and protection level.

Most preferably, the method further comprises receiving input associated with the factors.

According to an example of the preferred embodiments, the arrangement cost model incorporates a factor associated with location and design level of the path for each portion of a path, and sums the arrangement cost per unit length of a path to determine an arrangement cost of the path.

According to an example of the preferred embodiments, the repair rate model is based on spatially distributed ground motion intensity associated with the geographic terrain in which the path is arranged.

Preferably, the spatially distributed ground motion intensity comprises peak ground velocity.

According to another example of the preferred embodiments, the repair rate model is based on spatially distributed ground motion intensity associated with the geographic terrain of each portion of a path and sums the repair rate per unit length of a path to determine a repair rate of the path.

Additionally, the optimization in the method for determining optimal path arrangements comprises calculating a minimum weighted cost value over all design levels for each point on the modelled geographic terrain.

Preferably, the optimization further comprises transforming the optimization to an Eikonal equation based on the calculated minimum weighted cost value, and applying fast marching method to solve the Eikonal equation for determining the optimal path arrangements.

In addition, the method for determining the optimal path arrangements comprises determining a set of Pareto optimal solutions representing the optimal path arrangements.

In one specific implementation, the infrastructure link comprises a cable and the optimal path arrangements are optimal laying paths.

Preferably, the cable is an optical cable.

In a second aspect, the present invention is an information handling system, comprising one or more processors arranged to: model a geographic terrain containing the two geographic locations; optimize an arrangement cost and a repair rate for two or more potential paths based on the modelled geographic terrain, an arrangement cost model, and a repair rate model, taking into account at least two design levels; and determine the optimal path arrangements each including multiple path portions and respective design levels associated with the path portions based on the optimization; and a display arranged to display the determined optimal path arrangements. The system may further include input devices or means for receiving user input. Preferably, the system is further arranged to perform the method of the first aspect.

In a third aspect, the present invention is a non-transitory computer readable medium for storing computer instructions that, when executed by one or more processors, causes the one or more processors to perform a method for determining optimal path arrangements for an infrastructure link between two geographic locations, comprising: modelling a geographic terrain containing the two geographic locations; optimizing an arrangement cost and a repair rate for two or more potential paths based on the modelled geographic terrain, an arrangement cost model, and a repair rate model, taking into account at least two design levels; and determining the optimal path arrangements each including multiple path portions and respective design levels associated with the path portions based on the optimization. Preferably, the non-transitory computer readable medium is further arranged to perform the method of the first aspect.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which.

DETAILED DESCRIPTION OF THE PREFERRED EMBODIMENT

Path Optimization for Infrastructure Links

The invention relates to path optimization for an infrastructure link between two locations on the Earth's surface that crosses a hazardous area associated with natural causes or human activities that may lead to cable failures. Without loss of generality, for ease of exposition, we assume here that earthquakes are the main cause of cable failures, and we adopt the number of potential repairs along a cable as the measure of risk. This measure, widely accepted in practice as well as in the civil engineering literature, has two key advantages: firstly, it has a strong relationship with repair or reconstruction cost and is associated with societal cost incurred by cable failures and, secondly, it can be quantified in terms of cable repair rate and formulae for cable repair rate based on available ground motion intensity data.

In one embodiment, the focus is on path optimization of infrastructure links, such as undersea cables and long-haul oil/gas/water pipelines, where surface distance is a reasonable measure of the length of a link. Preferably, the problem can be formulated as a multi-objective variational problem and the objective is to find the set of Pareto optimal paths for the infrastructure link with two objective functions.

The first objective is to minimize the arrangement cost associated with the laying of the infrastructure link. Connecting the two locations through the route with the shortest surface distance, may minimize the arrangement cost but can increase the risk of damage or break in the event of an earthquake if the route is close to the hazard.

The second objective is to minimize the number of potential failures (hence repairs) along the infrastructure link in the wake of earthquakes, which may serve as an index of the cost associated with the loss and reconstruction of the link in the event of failures.

Figure 1:
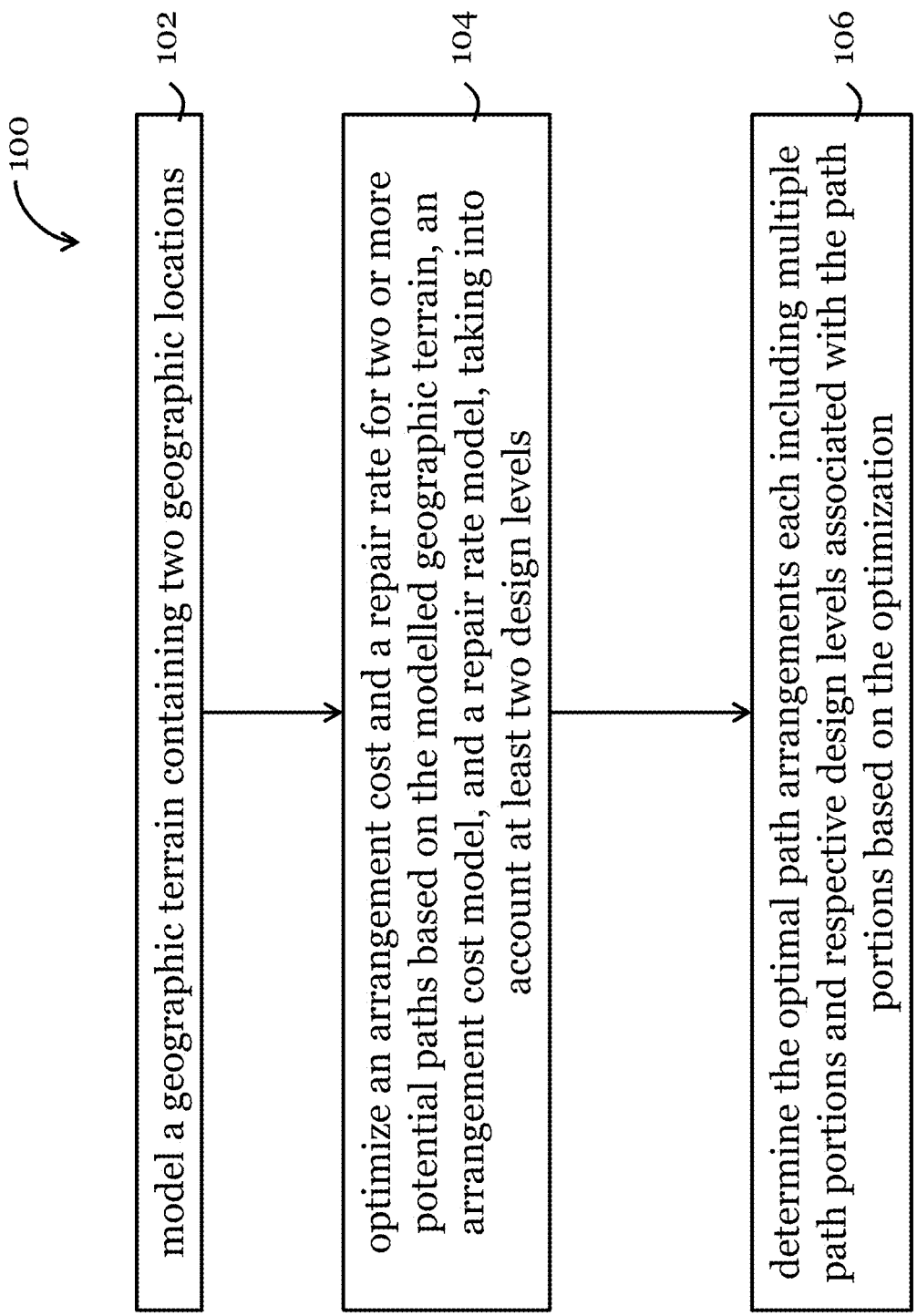
FIG. 1 a flow diagram illustrating a method for determining optimal path arrangement for an infrastructure link in one embodiment of the invention.

FIG. 1 shows a method wo for determining optimal path arrangements for an infrastructure link between two geographic locations. The method 100 comprises a step of modelling a geographic terrain containing the two geographic locations 102. The modelling of the geographic terrain in the present embodiment may be built on the state of the art in geographic information systems (GIS) for terrain approximation. GIS based path selection approaches digitize geographic data and represents the surface of the Earth by a graph. Multiple factors affecting cable path planning are considered through a summary cost which is a sum of the weighted costs of each of the factors.

The method 100 further comprises a step of optimizing an arrangement cost and a repair rate for two or more potential paths based on the modelled geographic terrain in step 102, an arrangement cost model, and a repair rate model while taking into account of at least two design levels.

In this embodiment, the two objective functions—arrangement cost and repair rate are considered. The first objective function may include the laying cost and the construction cost. For brevity, thereafter, the term arrangement cost used herein refers to both laying cost and construction cost. The laying cost is applicable to, for example, a telecommunication cable, while the construction cost is application to for example an oil pipeline. The second objective function is an index associated with the estimation of future number of repairs (or failures) of the link in a given time period (e.g., 100 years). Although the first objective is about cost incurred during construction, the second objective is about cost incurred in the (potentially, long term) future.

Factors associated with the estimation of the arrangement cost include the length of the link, location (with different ground/soil condition), requirement for security arrangements, licensing, etc. Whereas the repair rate (failure rate) indicates both potential costs of repairs, as well as link downtime that may have significant societal cost. As an illustration, after the Taiwan Earthquake in 2006, 18 cuts were found on eight submarine telecommunication cables, affecting Internet service of several Asian countries or regions for several weeks. The financial losses associated with Internet shutdown is enormous, as an estimation, a loss of 1.2% of annual GDP will incur per one week of Internet shutdown in a modern country such as Switzerland.

To calculate the total number of repairs for a link, the term repair rate is used to indicate the predicted number of repairs per unit length of the link over a fixed time period into the future. The present invention also takes into consideration of the design levels. For a specific link, the repair rate varies for different points on the link and depends on various factors as well, such as the geology, link material, and ground/soil conditions. In another context considering earthquakes effects, the repair rate has been widely used to assess reliability of water supply networks, and to analyse the risk to gas distribution.

To estimate the repair rate that is used for estimating the total number of repairs of a link, data of ground motion in the past during a certain period of time, or simulations based on given geological knowledge, is used. The method of this embodiment also takes advantage of the extensive work of the United States Geological Survey (USGS) analysts who develop models for the potential effects of future earthquakes.

The total number of repairs (and repair rate) indicates both the expected time period between the seismic events that will result in repairs and their probability of occurrence. The higher the probability of occurrence and intensity of seismic events, the larger the ground motion intensity and therefore the larger the repair rate.

In this embodiment, two objectives—arrangement cost and number of potential repairs—are considered. Other objectives can be easily integrated into the method of the embodiment if they can be computed as an integral of some quantity along the path. Effectively, this means the objectives are local and additive across multiple path segments.

The method 100 further comprises a step of determining the optimal path arrangements each including multiple path portions and respective design levels associated with the path portions based on the optimization 106. Raster-based path analysis, a conventional method, may be used to find the least accumulative cost path using Dijkstra's algorithm for cable route selection, taking into account cost minimization and earthquake survivability. But a major limitation of the raster-based path approach is that a path is restricted to use either a lateral link or a diagonal link when moving from a cell to adjacent cells, and it may not be able to obtain solutions of acceptable quality in a reasonable running time for realistic large scale problems.

In the present embodiment, the method boo for determining the optimal path can be approached by first converting the multi-objective variational problem into a single objective variational problem using the weighted sum method. Pareto optimal path can be obtained by solving an extended Eikonal equation, using the Fast Marching Method (FMM), taking in account of the trade-off between arrangement cost and repair rate. The method in the present invention also considers non-homogenous cables (i.e. segments of cables at more than one design levels) and the shape of cables (path planning) for determining an optimal path within a shorter running time with a better solution quality.

Modelling

Models are for designing the path and selecting the design level of each point on the path of a cable between the starting node and the destination along the Earth's surface or buried in shallow ground. Three models are described below.

A. Earth's Surface Model

In this embodiment, the Earth's surface is approximated by using a triangulated piecewise-linear two-dimensional manifold M in $R^3$. Each point on M is denoted by a three-dimensional coordinates (x,y,z), where $z=\xi(x,y)$ is the altitude of geographic location (x,y).

B. Laying Cost Model

As mentioned above, the arrangement cost is affected by various factors and can vary from one location to another. For a point $X=(x,y,z) \in M$, $\xi=(x,y)$, u: $M \rightarrow U$ is used to represent the design level at X. Without loss of generality, the design level variable u is assumed to take values of positive integers and $U=\{1, 2, \ldots, L\}$ is assumed to be same for all the points on M. The set of design levels for a cable is defined as $U=\{u(\cdot): M! \rightarrow U\}$. Function h(X; u) is defined to represent the unit length laying cost of design level $u \in U$ at X. The definition of h(X; u) enables it to incorporate parameters associated with the location and the design level as dependent factors influencing laying cost. Examples for such parameters include the local site attributes (e.g. soil type, elevation, etc.), labour, licenses (e.g. right of way) and protection level.

To construct a cable γ to connect the two nodes A and B in M, the laying cost of the cable γ with design levels $u(\cdot) \in U$ is represented by H (γ,u(·)). By the additive assumption of laying cost H (γ,u(·)) can be represented as $$H(\gamma,u(\cdot))=\int_\gamma h(X,u(X))ds \quad (1)$$

Assigning appropriately high positive real numbers to the function h(X; u) enables avoidance of problematic areas.

C. Cable Repair Model

The term repair rate is used to indicate the predicted number of repairs per unit length of the cable over a fixed time period into the future, including the design level variable u. The repair rate at location $X=(x,y,z) \in M$, $z=\xi(x;y)$ is defined as g (X,u); $u \in U$, where u is the design level at X. For the same location X on a cable, the repair rate caused by an earthquake is lower if higher design level is adopted, and vice versa. As discussed, a higher design level indicates higher laying cost and reduced number of repairs. In other words, $h(X, u_1) \leq h(X, u_2)$ and $g(X, u_1) \geq g(X, u_2)$ if $u1<u_2$ for any $X \in M$.

The high correlation between the repair rate and the ground motion intensity measure (e.g., Peak Ground Velocity) is accommodated in this embodiment, which is widely accepted in civil engineering. Let G (γ, u(·)) denotes the total number of repairs of a cable y, assuming that G (γ,u(·)) is additive. That is, G (γ,u(·)) can be rewritten as $$G(\gamma,u(\cdot))=\int_\gamma g(X,u(X))ds \quad (2)$$

where g (X, u(X)) $\in R_+^1$ is the repair rate with a particular design level u at location X.

Problem Formulation and Solution

The following provides the detailed mathematical formulation of the link path planning problem and then introduced the methodology of this embodiment. Based on the models of landforms, construction cost, and the potential required repairs, the multi-objective optimization problem of minimizing the construction cost and the total number of repairs is as follows:

$$\min_{\gamma, u(\cdot)} \Phi(\gamma, u(\cdot)) = (H(\gamma, u(\cdot)), G(\gamma, u(\cdot))), \quad \text{(Problem 1)}$$
$$\text{s.t. } \gamma(A) = A, \gamma(B) = B$$

where $\gamma$ is the cable that connects Start Node A and Destination Point B and $u(\cdot) \in U$ is the set of design levels for the cable $\gamma$.

To compute the two objectives of the cable $\gamma$, the natural parametrization of a curve is introduced: the curve $\gamma$ is parameterized by a function of arc length denoted by s, and each point X on the cable $\gamma$ can be represented by a function of s, i.e. $X=X(s)$. Using the natural parametrization of y and redefine $u: R_+ \cup \{o\}$, Equation (1) and Equation (2), we can rewrite $$H(\gamma, u(\cdot)) = \int^{l(\gamma)} h(\gamma(s), u(s)) ds, \quad G(\gamma, u(\cdot)) = \int^{l(\gamma)} g(\gamma(s), u(s)) ds \quad (3)$$

where $h(\gamma(s), u(s))$, $g(\gamma(s), u(s))$ are the unit laying cost and the repair rate at location $\gamma(s)$ with a specified seismic design level $u(s)$, respectively, and $l(\gamma)$ represents the total length of the cable $\gamma$.

The two objectives, arrangement cost and the total number of repairs, are conflicting. In general, it is impossible to simultaneously optimize both the construction cost and the total number of repairs. Therefore, a set of Pareto optimal solutions are sought. This problem is reduced to a multi-objective variational problem, if only one seismic design level is considered, i.e. $L=1$.

Problem 1 is converted into a single-objective optimization problem by weighting the two objectives as follows.

$$\min_{\gamma, u} \Phi'(\gamma, u(\cdot)) = \int_0^{l(\gamma)} f(\gamma(s), u(s)) ds, \quad \text{(Problem 2)}$$
$$\text{s.t. } \gamma(0) = A, \gamma(l(\gamma)) = B$$

where $f(\gamma(s), u(s)) = h(\gamma(s), u(s)) + c \cdot g(\gamma(s), u(s))$ and $c \in R_+^1 \cup \{o\}$.

The following theorem shows that a set of Pareto optimal solutions of Problem 1 can be obtained by solving Problem 2.

Theorem 1

If $(\gamma^*; u^*(\cdot))$ is an optimal solution for Problem 2, then it is Pareto optimal for the laying cost H and the total number of repairs G.

For any point $S \in M$, we define a cost function $\phi(S)$ that represents the minimal cumulative weighted cost to travel from End Point B of the cable to point S as $$\phi(S) = \min_{\beta, u(\cdot)} \int_0^{l(\beta)} f(\beta(s), u(s)) ds, \quad (4)$$

where $\beta \in \text{Lip}([o, +\infty); M)$ is a Lipschitz continuous path parameterized by its length, $$\|\beta'(s)\| = \left\| \frac{d\beta(s)}{ds} \right\| = 1,$$

$X(o) = X_B$, and $X(l(\beta)) = X_S$. By Equation (4) and the definition of $f$, and applying the fundamental theorem of the calculus of variations, it has been shown that the optimal paths are the gradient descent contours of a specific Eikonal equation.

Theorem 2

$\phi(S)$ is the viscosity solution of the following Eikonal equation, $$\|\nabla \phi(S)\| = \min_u f(S, u), \quad \phi(B) = 0 \quad (5)$$

where $\nabla$ is the gradient operator and $\|\cdot\|$ is the 2-norm.

For any point S, $\phi(S)$ is called the level set function; that is, $\{S \in M: \phi(S) = a\}$ is a curve composed of all the points that can be reached from point B with minimal cost equal to a. The optimal path(s) is (are) along the gradient of $\phi(S)$; i.e., orthogonal to the level curves. From Problem 2 and Equation (5), it can be observed that the joint optimization of the path $\gamma$ and the design levels $u(\cdot)$ has been decomposed into two separate stages, of which the first stage is to calculate the minimum weighted cost value over all design levels for each point $S \in M$, and the second stage is to solve the Eikonal equation.

Theorem 2 shows that FMM can be applied to solve Problem 2. FMM is a computationally efficient and convergent algorithm, to solve the Eikonal equation. Here, for each point $S \in M$, an additional step of calculating the minimum weighted cost value over all design levels; that is, $\min_{u \in E u} f(S, u)$, has to be executed before running FMM. This means for a fixed weight value c, once the minimum weighted cost value $f'(S) = \min_{u \in E u} f(S, u)$ for each $S \in M$ is derived, $f' \phi(S)$ can be input into the FMM, and the corresponding Pareto optimal solutions can be obtained. By varying the weight value c in the calculation of the single combined objective function Problem 2, a Pareto optimal set of Problem 1 is obtained.

The method of this embodiment provides an algorithm, called Algorithm 1, for optimizing both the path planning and design levels.

---

Algorithm 1 - Algorithm for optimization of both the path planning and design levels in the region of interest D.

---

Input: Region D (modelled as M), spatially distributed PGV data and laying cost data for each design level u on D, mesh size $\Delta_x$, $\Delta_y$, Start Point A, End Point B, c, step size $\tau$;
Output: Path $\gamma$ and design level $u(\gamma)$ with minimum weighted cost;
  1: Discretize D rectangularly with $\Delta_x$ in x and $\Delta_y$ in y, and denote the set of points on the grid by $\Gamma$;
  2: Based on the PGV data on D, calculate the repair rate g(i, j, u) for each grid point $(i, j) \in \Gamma$ and design level u;

Algorithm 1 - Algorithm for optimization of both the path planning and design levels in the region of interest D.

3: For each grid point $(i, j) \in \Gamma$, let $f'(i, j) = \min_u (h(i, j, u) + c \cdot g(i, j, u))$, where $h(i, j, u)$ is the laying cost at grid point $(i,j)$ with design level $u$;
4: Create edges, faces and obtain a complete triangulation (i.e., M) of D based on $\Gamma$;
5: Denote the approximate value of $\phi$ by $\bar{\varphi}$ satisfying $\bar{\varphi}(i, j) \cong \phi (i\Delta_x + x_B, j\Delta_y + y_B)$. Let $\bar{\varphi}(0, 0) = 0$ and set End Point B to Near. Define the neighbors of a grid element $(i, j)$ to be the set $\Gamma_{(i,j)}$.
6: while Near list is not empty do
7:    Find a point $(i, j)$ with the minimum value $\bar{\varphi}$ in Near list, and set it to be Frozen.
8:    For each point $(i', j') \in \Gamma_{(i,j)}$, if $(i', j')$ is not Frozen, for each face $\varsigma \in \Sigma$, $\Sigma = \{ \varsigma , (i', j') \in \varsigma \}$, calculate $\bar{\varphi}(i',j')$ and update its value with the minimum one using Equations (10) or (11) in [9].
9:    If $(i',j')$ is Far, update its value by $\bar{\varphi}(i',j')$ and add it in the Near list; otherwise update its value by minimum of $\bar{\varphi}(i',j')$ and its current value.
10: end while
11: Let $\gamma_0 = A$ and $k = 0$.
12: while $\|\gamma_k - B\|^2 > \varepsilon$ do
13:    Compute the gradient $G(\gamma_k)$ using finite-difference based on Equation (6) in [9].
14:    Compute $\gamma_{k+1} = \gamma_k - \tau G(\gamma_k)$, where $\gamma_k$ is an approximation of $\gamma(t)$ at time $t = k\tau$.
15:    Let $u(\gamma_{k+1})$ be the design level of the grid point nearest to $\gamma_{k+1}$.
16: end while
17: return $\gamma$ and $u(\gamma)$.

[9]: Wang Z. et al., "*Multiobjective path optimization for critical infrastructure links with consideration to seismic resilience*" Computer Aided Civil and Infrastructure Engineering, vol. 32, no. 10, pp. 836-855, Oct. 2017.

Comparing with the multi-objective variational optimization problem without considering multiple design levels, the only additional computational cost is caused by calculating f'(S). Note that the computational complexity of FMM is O(Nlog(N)), where N is the number of nodes in M, enabling applicability to large scale problems.

Applications

This section illustrates the applications of Algorithm 1 to scenarios based on 3D realistic scenarios. Without loss of generality, two seismic design levels are assumed in these two scenarios; Levels 1 and 2 with low and high level protection respectively. Considering the trade-off between the laying cost and the total number of repairs, the Pareto optimal solutions are obtained and the corresponding (approximate) Pareto front is generated. In addition, the FMM-based method is compared to the LS-based algorithm (Algorithm 1) and LS-IP algorithm. The codes are run in Matlab R2016b on a Lenovo ThinkCenter M900 Tower desktop (64 GB RAM, 3.4 GHz Intel(R) Core(TM) i7-6700 CPU).

A. The First Scenario

Figure 2:
FIG. 2 is a map showing an exemplary D1, wherein the red line illustrates a fault line.

FIG. 2 shows a map of an exemplary region D1, which is located in State of California from northwest (35:00° N, −118:00° E) to southeast (33:00° N, −116:00° E). The red line cutting through the region D1 illustrates the San Andreas fault line. A cable is to be laid connecting Start Point (33:55° N, −117:65° E) to End Point (35:00° N, −116:00° E) as shown in FIG. 2.

The elevation data was downloaded from the General Bathy metric Chart of the Oceans (GEBCO) and the Peak Ground Acceleration (PGA) data from USGS. The spatial resolution of the elevation data and the PGA data are arc-second and 180 arc-second, respectively. The equation 6 is used to convert PGA to Peak Ground Velocity (PGV) for calculating repair rate of the cable as follows, $$\log_{10}(v) = 1.0548 \log_{10}(PGA) - 1.5566 \quad (6)$$

where v (cm/s) represents the PGV value.

Figure 3:
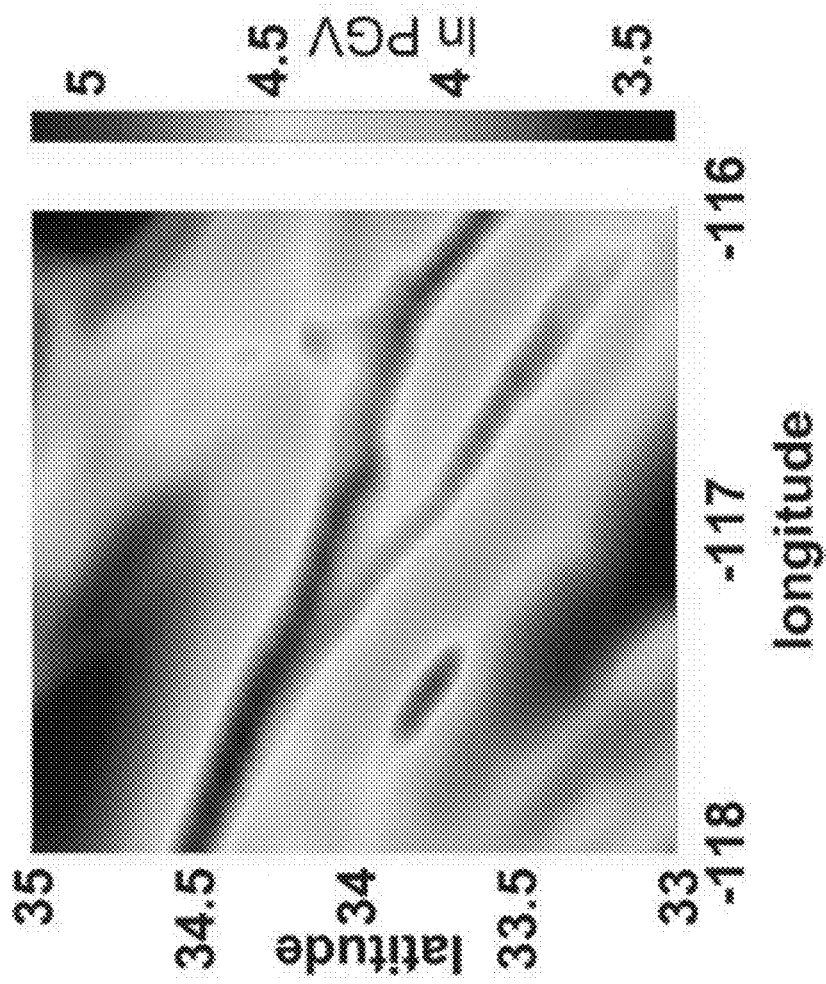
FIG. 3 is a shaded surface map of Peak Ground Velocity (PGV) for region D1 in log scale.

FIG. 3 shows a shaded surface map of Peak Ground Velocity (PGV) for region D1 in log scale. Referring to FIG. 2 and FIG. 3, if a cable is laid from Start Point to End Point, it has to pass through a high risk area due to the existence of San Andreas fault line. Since the spatial resolution of the PGA data is lower than that of the elevation data, and the computational complexity of the FMM-based method is lower than that of the LS-based algorithm, the elevation data is first downsampled to the level of the resolution of the PGA data (i.e., 180 arc-second) in order to compare the FMM-based method with the LS-based algorithm. Therefore, two sets of data are used: the original PGA data and the downsampled elevation data, which is call the low-precision data herein.

To show the benefit of deriving better approximate Pareto front using high resolution data and to take advantage of the computational efficiency of the FMM-based method, high-precision data is then generated by interpolating the PGA data (i.e., complementing missing data by interpolation) to make it have the same spatial resolution as the original elevation data (i.e., arc-second). Then, the FMM-based method is applied to both the low-precision data and the high-precision data. As mentioned, the LS-based algorithm is applied to the low-precision data only since it cannot be used to obtain the Pareto front in a reasonable time for the high-precision data. Thereafter, the LS-based algorithm using the low-precision data is compared with the FMM-based method.

FIGS. 4A, 4B, 4C, 4D, 4E and 4F are Pareto optimal paths modelled on the PGV map of region D1 using high-precision data, where in each of these figures, the 3D topographic landform shown is on the left and the corresponding 2D logarithmic PGV from top view is on the right, and where the magenta lines indicate the cable or cable segments adopting Level 1, and the black lines indicate the cable or cable segments adopt Level 2.

The corresponding data collected from each of the Pareto optimal paths in FIGS. 4A-4F, including the laying cost H ($\gamma^*$; $u^*(\cdot)$) and total number of repairs G ($\gamma^*$; $u^*(\cdot)$) are shown in Table I.

TABLE I

| | c | H (γ*, u*(·)) | G (γ*, u*(·)) |
|---|---|---|---|
| a | 0 | 220.7205 | 42.5164 |
| b | 3.8 | 222.3874 | 41.6799 |
| c | 6.2 | 276.6942 | 29.6408 |
| d | 10.5 | 421.0422 | 13.0290 |
| e | 24 | 491.5129 | 8.5157 |
| f | 500 | 534.2173 | 8.0231 |

Referring back to FIGS. 4A-4F, example ways of reducing risk (lower number of repairs) may be by adding segments with high level protection (see the black lines as shown in FIG. 4c) and by increasing the length of the cable to avoid the high risk areas shown in FIG. 4b. Additionally, the laying cost increases and the total number of repairs decreases when some parts of the cable have high level protection.

Figure 4A:
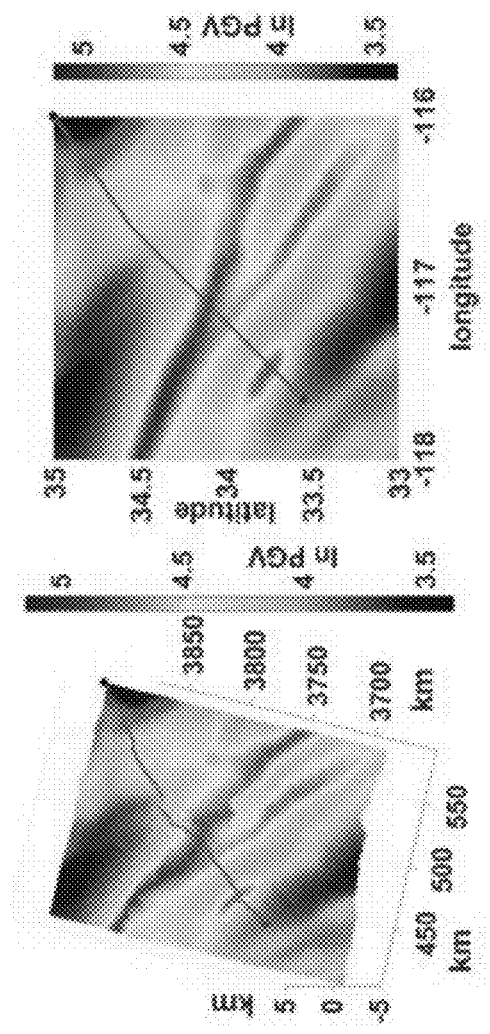
FIGS. 4A, 4B, 4C, 4D, 4E and 4F are Pareto optimal paths modelled on the PGV map of region D1, where the magenta lines indicate the cable or cable segments being adopted at a first design level, and the black lines indicate the cable or cable segments being adopted at a second design level.
Figure 4B:
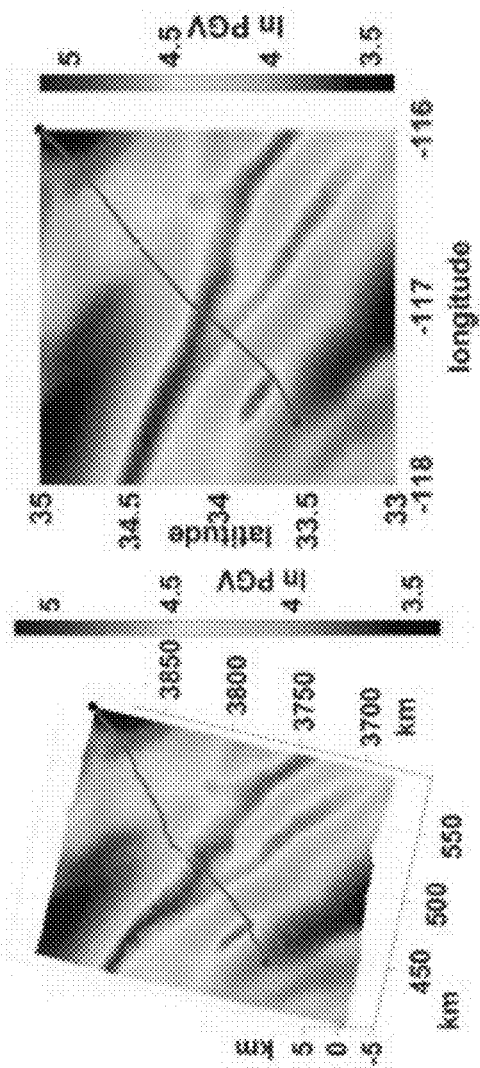
Figure 4C:
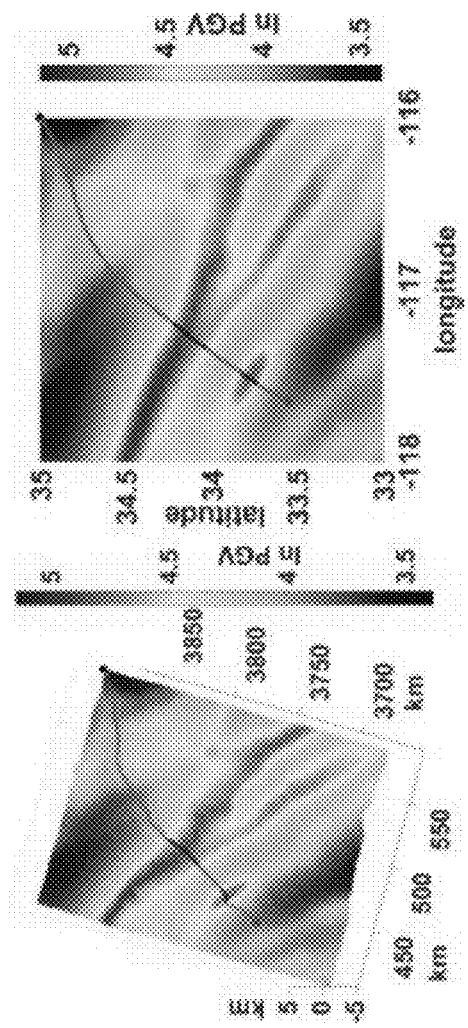
Figure 4D:
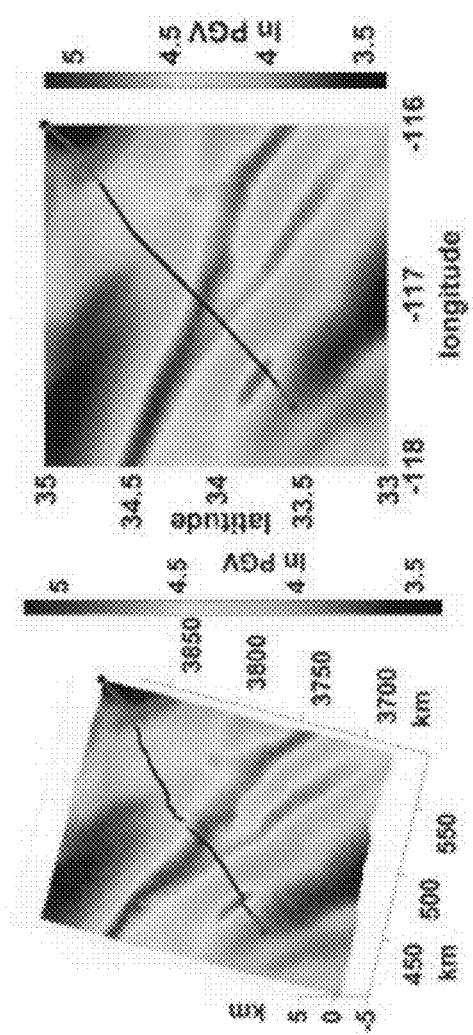
Figure 4E:
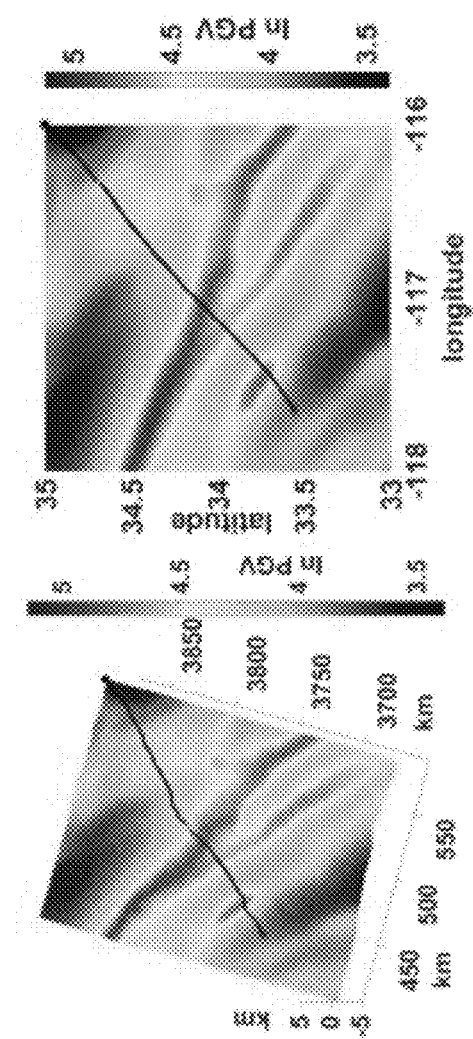
Figure 4F:
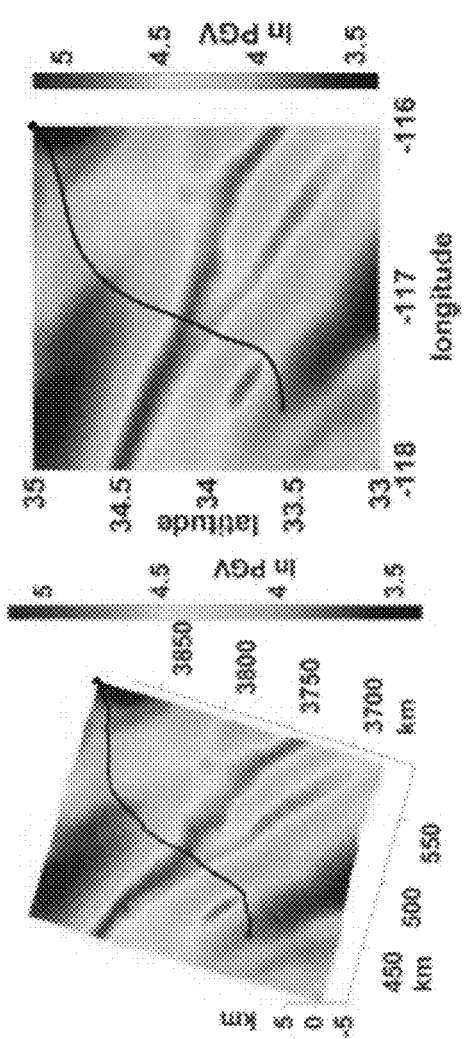

From FIG. 4a and FIG. 4b, the cable is designed to keep away from the high PGV areas to reduce the total number of repairs. However, it is evident from Table I that avoiding the high PGV areas is not an effective way to decrease the total number of repairs of the cable. In this scenario, the San Andreas fault line cuts through the objective region D. This implies that the designed path has to pass through the high PGV areas and a higher design level should be adopted for the cable deployed in such high risk areas. Adopting a higher design level for some parts of the cable is noticeable, and these higher level protected segments become longer around the high PGV areas as shown by FIG. 4c and FIG. 4d. The reduction of the total number of repairs is significant but with an increased laying cost by deploying a higher design level for the cable.

Table I shows the trade-off between the laying cost and the total number of repairs. In order to generate the (approximate) Pareto front, the weight value c may be varied from 0 to moo. As the weight value c increases, the laying cost increases and the total number of repairs decreases. In other words, the higher the laying cost, the lower the total number of repairs.

Figure 5:
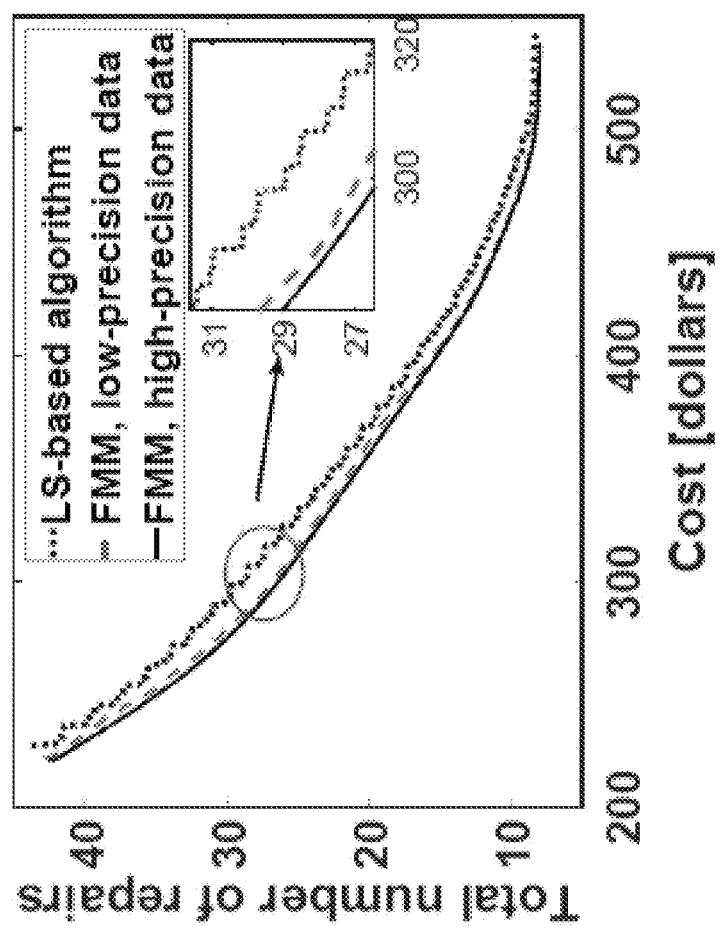
FIG. 5 is a graph showing non-dominated front for two objectives–total number of repairs and cable laying cost, where the red dash line illustrates Pareto front obtained by Fast Marching Method (FMM) with low-precision data, the black solid line illustrates Pareto front obtained by FMM with high-precision data, and the blue dash line illustrates Pareto front obtained by Label-Setting (LS) algorithm with low-precision data.

FIG. 5 is a graph showing non-dominated front for two objectives–total number of repairs and cable laying cost, where the red dash line illustrates Pareto front obtained by Fast Marching Method (FMM) with low-precision data, whereas the black solid line illustrates Pareto front obtained by FMM with high-precision data. The (approximate) Pareto fronts consist of 451 points and 841 points. The FMM-based method that uses data with higher precision generates more accurate path planning and a better approximation for the Pareto front. The blue dash line illustrates Pareto front obtained by Label-Setting (LS) algorithm with low-precision data, and the Pareto front (consists of 1381 points) is obtained by the LS-based algorithm using the low-precision data.

FIG. 5 shows that for the same total number of repairs, the laying costs obtained by FMM-based method using both the low-precision data and the high-precision data are smaller than that obtained by the LS-based algorithm. If the total number of repairs is set to be the same and larger than 15, commonly the laying cost obtained by the FMM-based method using high-precision data will be reduced approximately by 4% comparing with the LS-based algorithm. This reduction increases to about 6.5% if the total number of repairs is set in the range of 25 to 30.

Figures 6A, 6B:
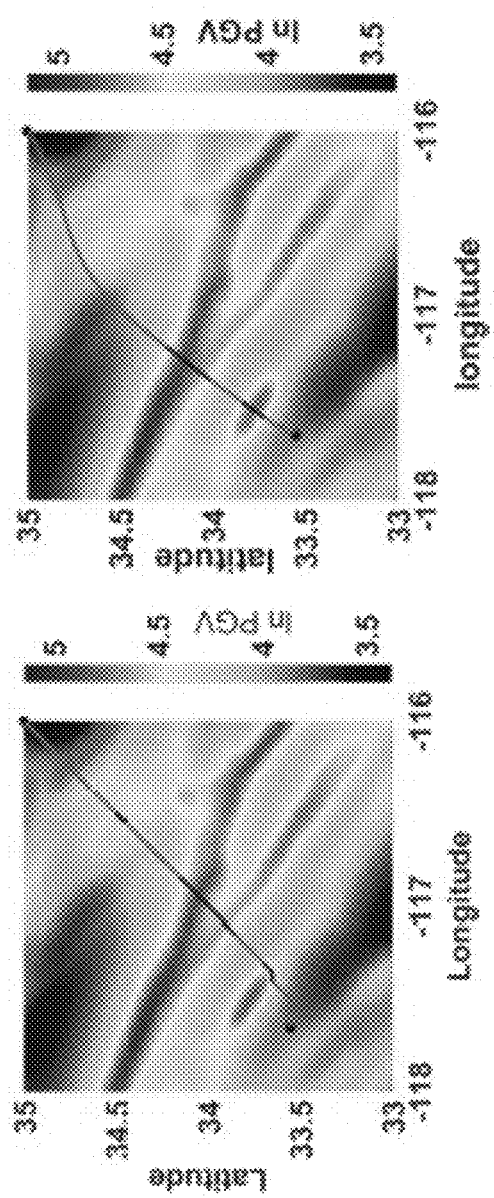
FIG. 6A is an optimal path arrangement obtained by LS algorithm on a PGV map of region D1, where the magenta lines indicate the cable or cable segments being adopted at a first design level, and the black lines indicate the cable or cable segments being adopted at a second design level.
FIG. 6B is an optimal path arrangement obtained by FMM algorithm on a PGV map of region D1, where the magenta lines indicate the cable or cable segments being adopted at a first design level, and the black lines indicate the cable or cable segments being adopted at a second design level.

FIG. 6A is an optimal path arrangement obtained by LS algorithm on a PGV map of region D1, and FIG. 6B is an optimal path arrangement obtained by FMM algorithm on a PGV map of region D1.

Table II shows the laying cost H (γ*; u*(·)) and the total number of repairs G (γ*; u*(·)) of the Pareto optimal path using FMM-based method and the LS-based algorithm.

TABLE II

| | H (γ*, u*(·)) | G (γ*, u*(·)) |
|---|---|---|
| LS-based algorithm | 304.1759 | 28.4903 |
| FMM-based method (high-precision data) | 284.0619 | 28.5005 |

The two paths in FIG. 6A and FIG. 6B have very similar total number of repairs, as shown in Table II. The laying cost reduction is up to 6.61%. This difference is significant considering the billions of dollars spent around the world on telecommunications cabling. Although the total number of repairs of the two cables are very close, their corresponding paths are quite different.

In terms of the computational cost, it takes 251s and 5,192s for the FMM-based method to obtain the (approximate) Pareto fronts using the low-precision data and the high-precision data, respectively. The running time of the LS-based algorithm is 2,409s for the low-precision data. As a result, bearing in mind the higher quality solution from the FMM-based method, it is difficult to make a case for the LS-based algorithm.

B. The Second Scenario

Figure 7:
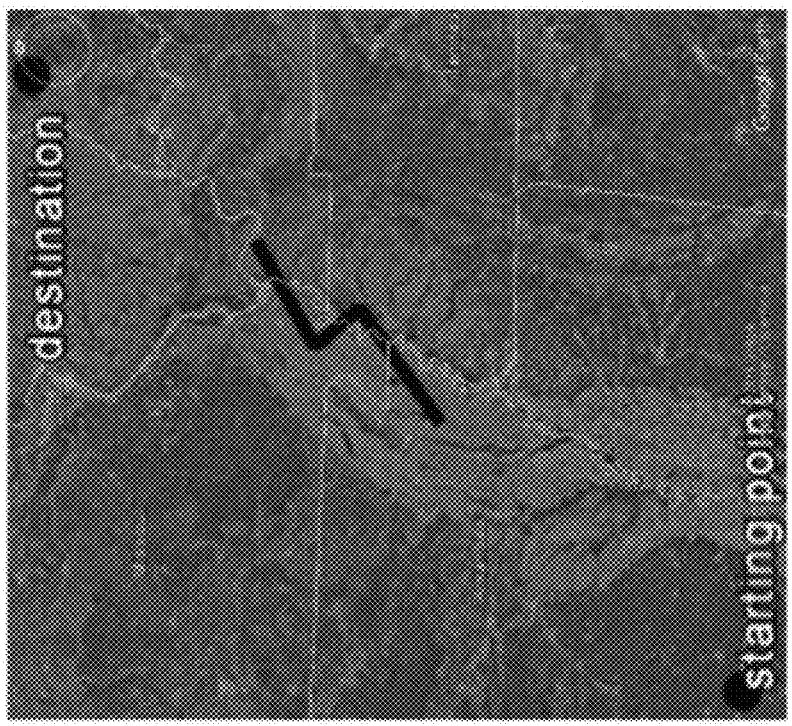
FIG. 7 is a map showing an exemplary region D2, wherein the black line illustrates a fault line.

FIG. 7 shows a map of an exemplary region D2, a large scale realistic landform in the central US. The objective region D2 is from the southwest corner (33:00° N, −93:00° E) to northeast corner (39:00° N, −87:00° E). The black line illustrates the New Madrid fault line, located in the central of D2.

Figure 8:
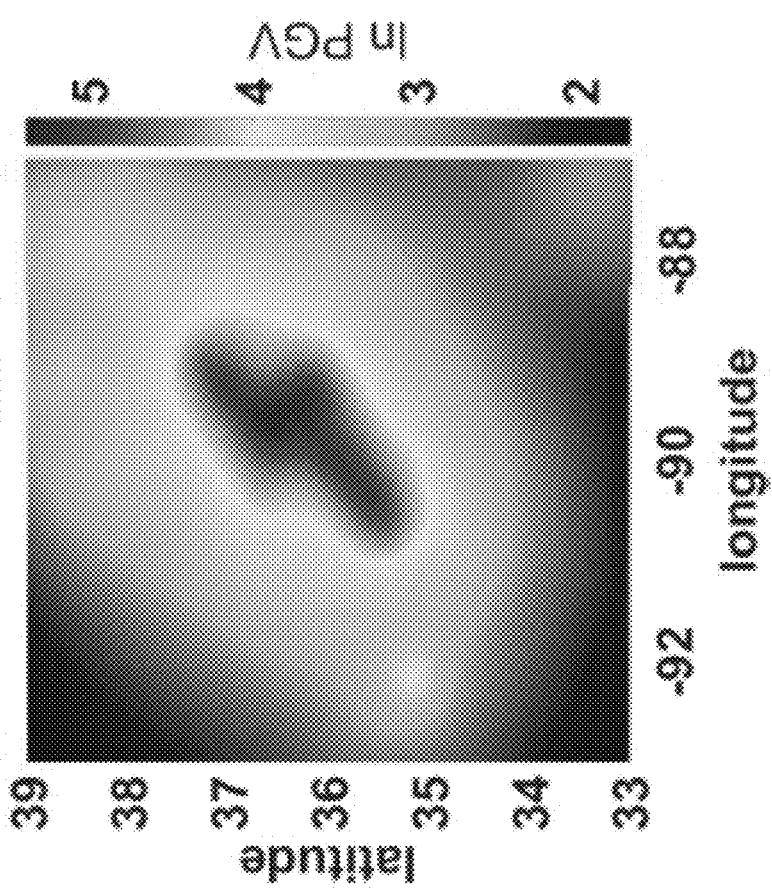
FIG. 8 is a shaded surface map of Peak Ground Velocity (PGV) for region D2 in log scale.

FIG. 8 shows a shaded surface map of Peak Ground Velocity (PGV) for region D2 in log scale. To design the path for a cable from the southwest corner (33:00° N, 93:00° E) to northeast corner (39:00° N, −87:00° E), again, the elevation data is downsampled or interpolates the PGA data to generate the low-precision data (i.e., 120 arc-second spatial resolution) and the high-precision data (i.e., arc-second spatial resolution). The (approximate) Pareto fronts (consists of 754 points and 823 points), obtained by the FMM-based method using the low-precision data and the high precision data through varying the weight value c from 0 to 1200, are shown by the brown dotted line and the black solid line in FIG. 10, respectively. From FIG. 10, the (approximate) Pareto fronts obtained using the low-precision data and the high-precision data are very close. Several selected optimal paths obtained by the FMM-based method using the high-precision data are shown in FIG. 9 and the corresponding laying cost and the total number of repairs are shown in Table III.

TABLE III

| | c | H (γ*, u*(·)) | G (γ*, u*(·)) |
|---|---|---|---|
| a | 0 | 856.1859 | 169.0890 |
| b | | | |
| c | | | |
| d | | | |
| e | | | |
| f | 0.08 | 858.5708 | 105.4468 |
| | 3 | 915.8102 | 36.8502 |
| | 20 | 1013.4460 | 21.8293 |
| | 50 | 1159.4206 | 18.3306 |
| | 800 | 2347.7978 | 4.1533 |

Figure 9A:
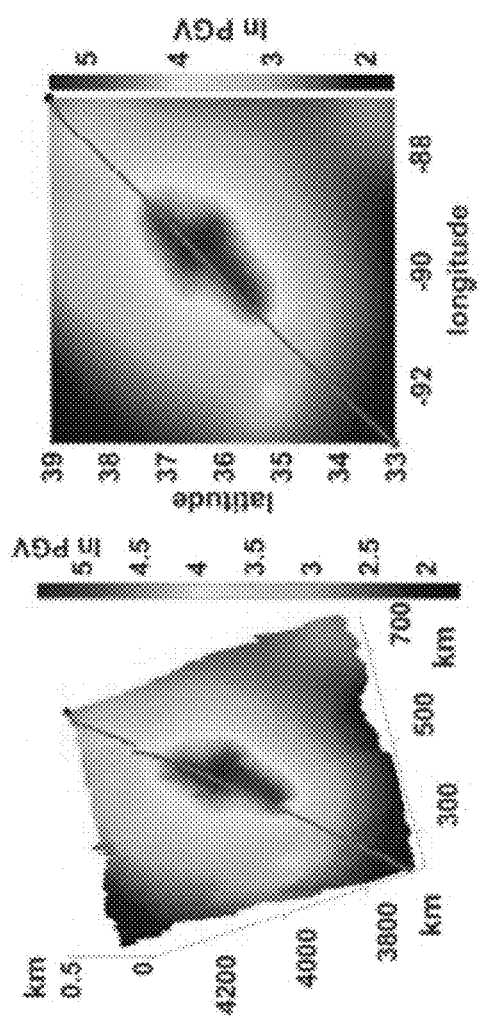
FIGS. 9A, 9B, 9C, 9D, 9E and 9F are Pareto optimal paths modelled on the PGV map of region D2, where the magenta lines indicate the cable or cable segments being adopted at a first design level, and the black lines indicate the cable or cable segments being adopted at a second design level.
Figure 9B:
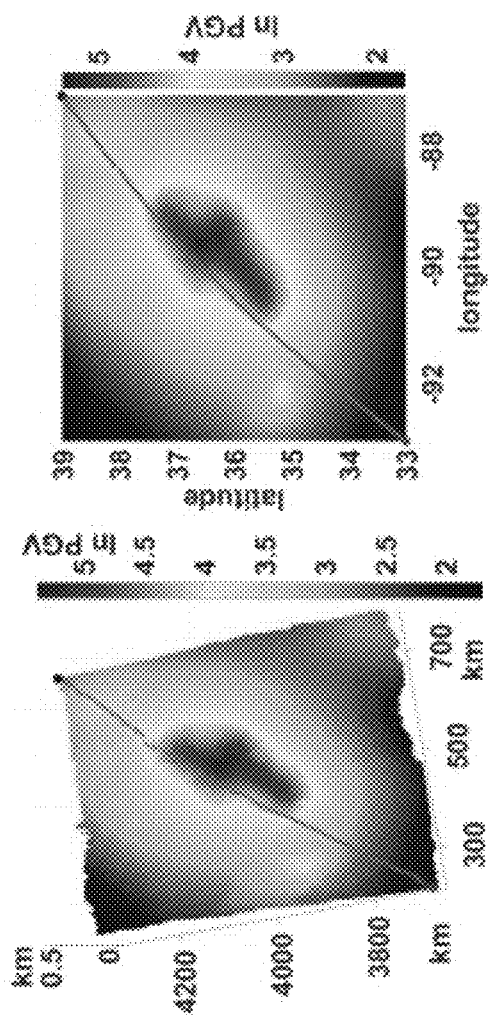
Figure 9C:
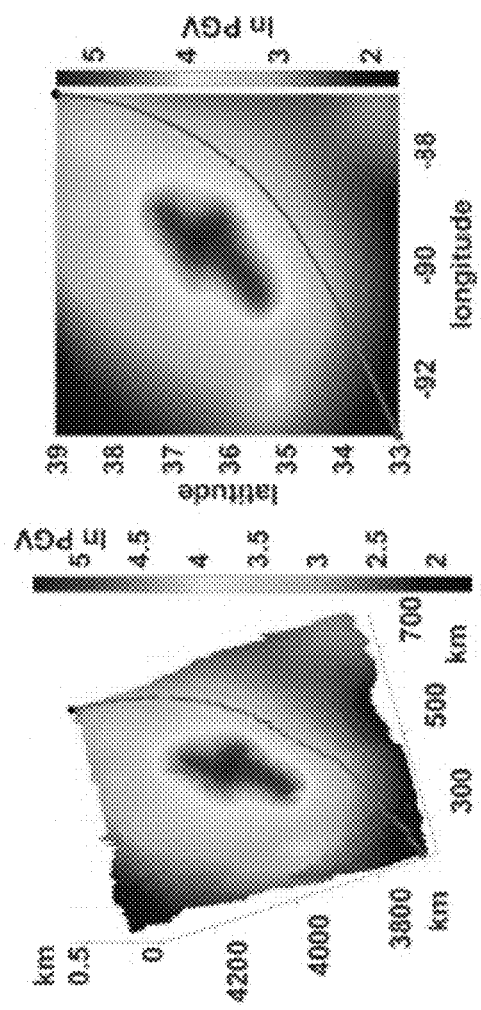
Figure 9D:
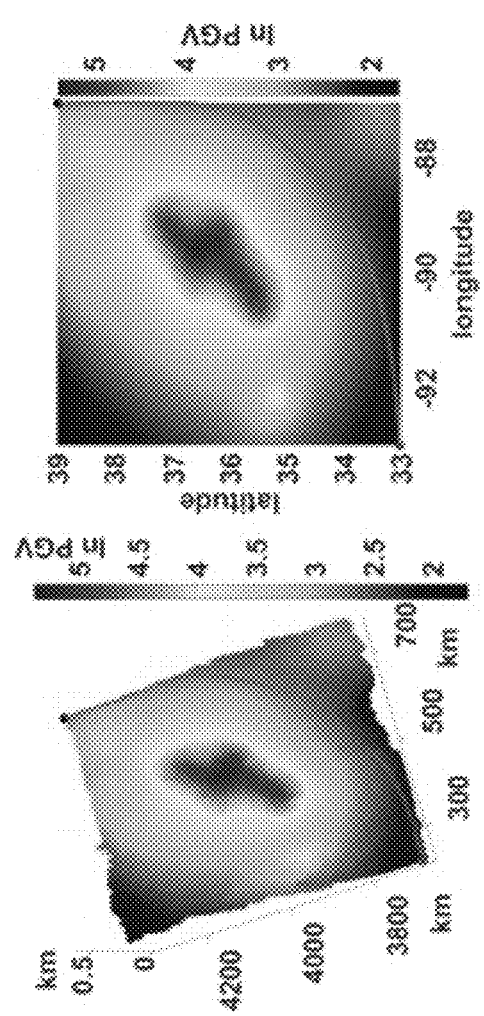
Figure 9E:
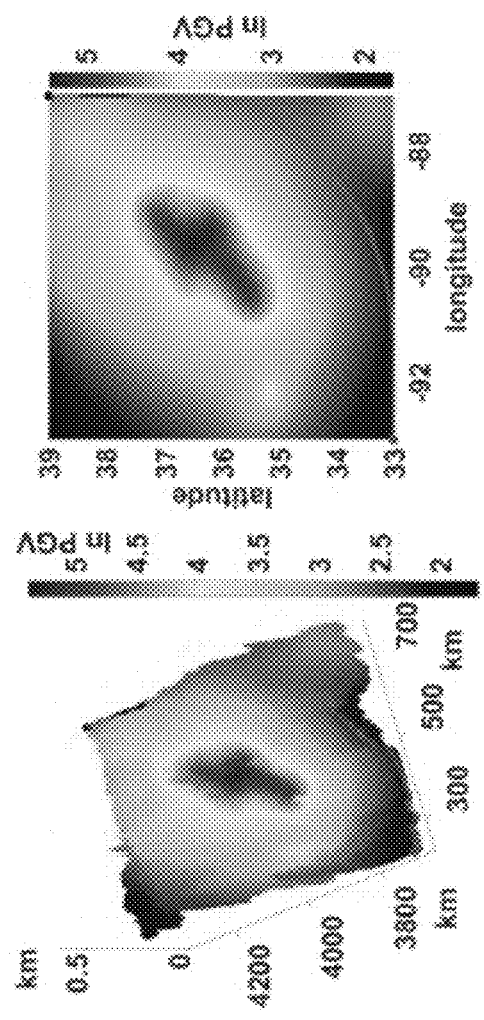
Figure 9F:
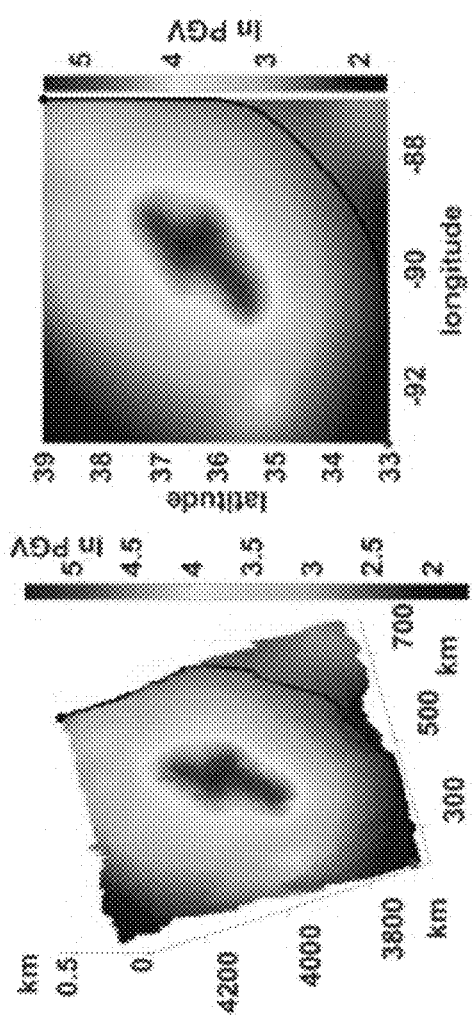

FIGS. 9A-9F are Pareto optimal paths modelled on the PGV map of region D2, where the magenta lines indicate the cable or cable segments being adopted at a first design level, and the black lines indicate the cable or cable segments being adopted at a second design level. Unlike in the first scenario, to reduce the total number of repairs of the cable in this scenario, avoiding the high PGV areas is much more effective than adopting a higher design level since the designed path can totally avoid the high PGV areas through deploying a longer cable as shown by FIG. 9C and FIG. 9D.

Figure 10:
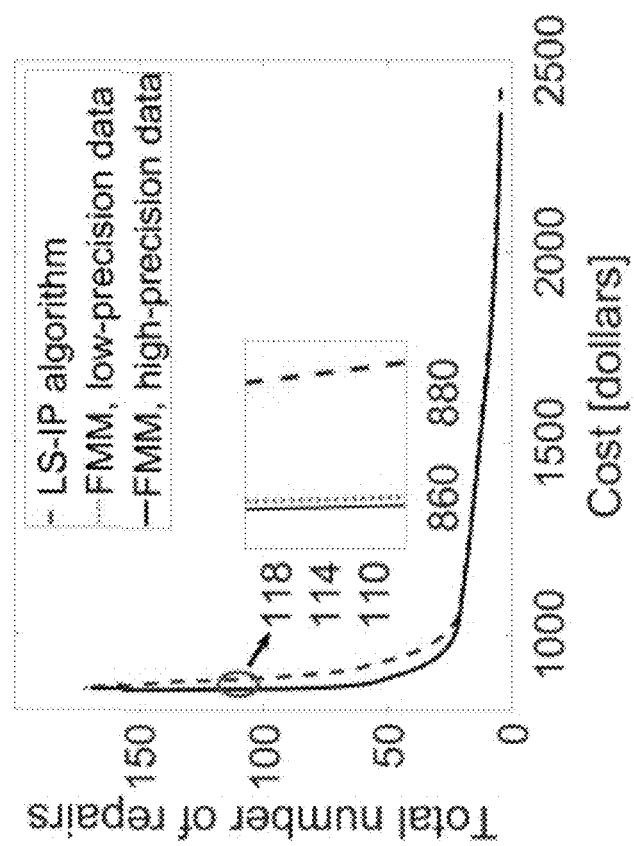
FIG. 10 is a graph showing non-dominated front for two objectives–total number of repairs and cable laying cost, where the red dash line illustrates Pareto front obtained by Fast Marching Method (FMM) with low-precision data, the black solid line illustrates Pareto front obtained by FMM with high-precision data, and the blue dash line illustrates Pareto front obtained by Label-Setting (LS) algorithm with low-precision data.

FIG. 10 is a graph showing non-dominated front for two objectives–total number of repairs and cable laying cost, where the red dash line illustrates Pareto front obtained by Fast Marching Method (FMM) with low-precision data, the black solid line illustrates Pareto front obtained by FMM with high-precision data, and the blue dash line illustrates Pareto front obtained by Label-Setting (LS) algorithm with low-precision data.

The raster-based LS-based algorithm is not applicable for such a large scale landform even when the low-precision data is used. Therefore instead, LS-IP algorithm is run using the low-precision data by setting ε=0.8, obtaining the Pareto front (consists of 336 points) shown by the blue dash line in FIG. 10. Note that the number of nodes of the generated graph is too large to obtain the Pareto front for LS-IP if the high-precision data is used. From FIG. 10, it is observed that the FMM-based method performs at least as well as the LS-IP algorithm. But if the total number of repairs is set in the range of 25 to 100, typically a more than 3.5% laying cost reduction is obtained by applying the FMM-based method.

In term of computational cost, the running time for the FMM-based method using the low-precision data, the high-precision data and LS-IP, are 1,308s, 62,526s and 15,334s, respectively. It is seen, again, that the FMM-based method has much better performance than LS-IP on computational cost if the same data is used.

Based on the above first and second scenarios, it is evident that the FMM-based method not only performs better on finding the approximate Pareto front, but also runs much faster than the LS-based algorithm and the LS-IP algorithm. For the Problem 1 with a very large scale landform, the FMM-based method can be adopted because of its efficiency and solution quality.

Advantage

The method in the embodiment has provided an optimal and computationally effective approach to solve the multi-objective optimization problem, taking into account of laying cost and total number of repairs of the cable as the two objectives. Whereby solving the problem allows the determination of optimal path arrangements for an infrastructure link between two geographic locations. Advantageously, the present invention also considers the path optimization and non-homogenous construction problem for a cable connecting two points on Earth's surface with high risk areas when multiple design levels are available.

Comparing with the existing raster based algorithms, namely, the LS-based algorithm and the LS-IP algorithm, the FMM-based method in the present invention is advantageous in that it has a better performance both on the approximation of Pareto fronts and the computational cost.

Exemplary System

Figure 11:
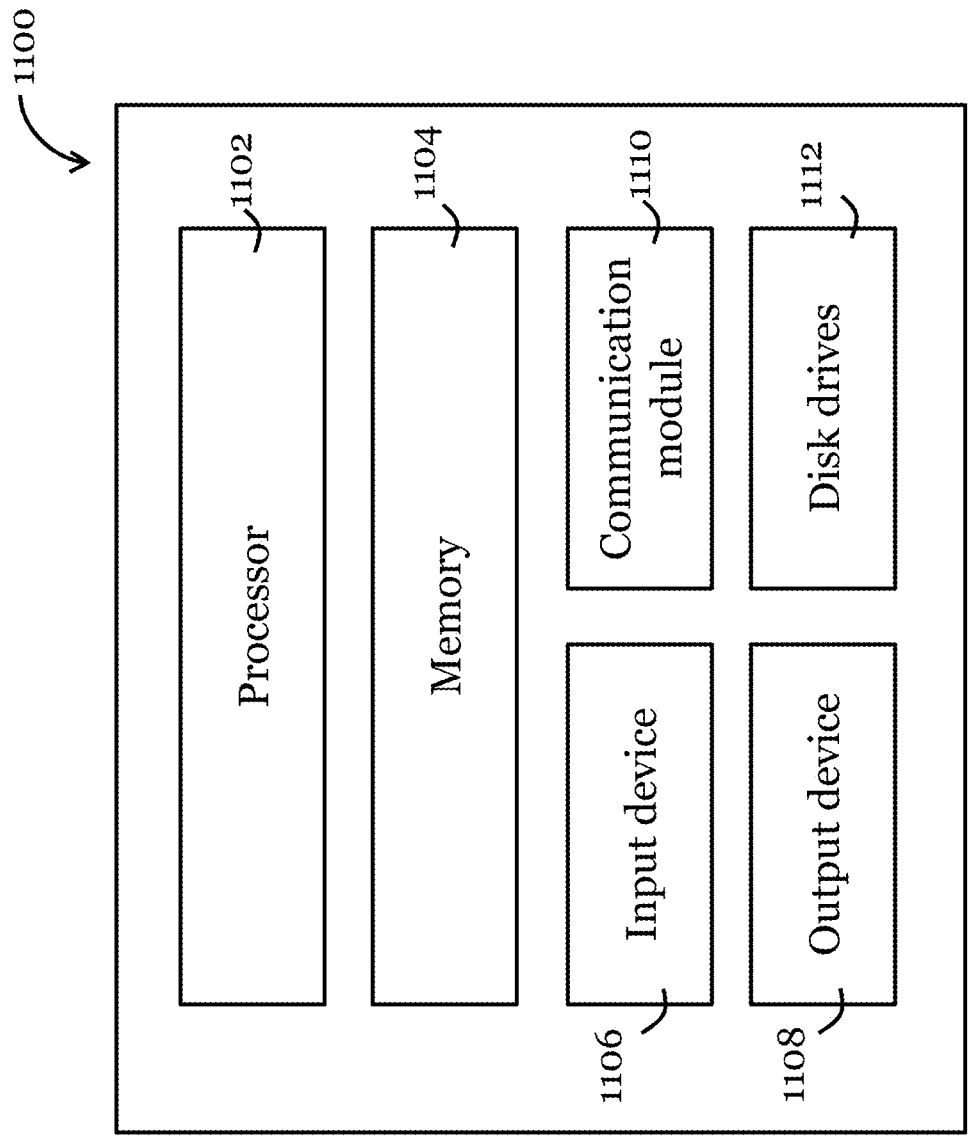
FIG. 11 is an information handling system that can be configured to operate the method in one embodiment of the invention.

Referring to Figure ii, there is shown a schematic diagram of an exemplary information handling system 1100 that can be used as a server or other information processing systems in one embodiment of the invention for performing the method in the invention. Preferably, the server 1100 may have different configurations, and it generally comprises suitable components necessary to receive, store and execute appropriate computer instructions or codes. The main components of the server 1100 are a processing unit 1102 and a memory unit 1104. The processing unit 1102 is a processor such as a CPU, an MCU, etc. The memory unit 1104 may include a volatile memory unit (such as RAM), a non-volatile unit (such as ROM, EPROM, EEPROM and flash memory) or both. Preferably, the server 1100 further includes one or more input devices 1106 such as a keyboard, a mouse, a stylus, a microphone, a tactile input device (e.g., touch sensitive screen) and a video input device (e.g., camera). The server 1100 may further include one or more output devices 1108 such as one or more displays, speakers, disk drives, and printers. The displays may be a liquid crystal display, a light emitting display or any other suitable display that may or may not be touch sensitive. The server 1100 may further include one or more disk drives 1112 which may encompass solid state drives, hard disk drives, optical drives and/or magnetic tape drives. A suitable operating system may be installed in the server 1100, e.g., on the disk drive 1112 or in the memory unit 1104 of the server 1100. The memory unit 1104 and the disk drive 1112 may be operated by the processing unit 1102. The server 1100 also preferably includes a communication module 1110 for establishing one or more communication links (not shown) with one or more other computing devices such as a server, personal computers, terminals, wireless or handheld computing devices. The communication module 1110 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 1102, the memory unit 1104, and optionally the input devices 1106, the output devices 1108, the communication module 1110 and the disk drives 1112 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 1100 shown in FIG. 11 is merely exemplary, and that different servers 1100 may have different configurations and still be applicable in the invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. For example, the method can be applied to determine optimal laying arrangement of any infrastructure link, including fluid pipeline (e.g., oil, water, and gas pipes), electric power cables, electric data cables, optical cables, etc. The present embodiments are to be considered in all respects as illustrative, not restrictive.

The invention claimed is:

1. A computer-implemented method for determining optimal laying paths for a cable between two geographic locations, comprising:

modelling, using one or more processors, a geographic terrain containing the two geographic locations, the modelling including modelling the geographic terrain into a grid with multiple grid points such that each of the grid points on the modelled geographic terrain is denoted by a respective 3D coordinate including an altitude of a corresponding geographic location of the geographic terrain;

jointly optimizing, using the one or more processors, two or more potential paths for the cable between the two geographic locations and at least two levels of shielding for each of the two or more potential paths of the cable, based on the modelled geographic terrain, an arrangement cost model that takes into account the at least two levels of shielding, and a repair rate model that takes into account the at least two levels of shielding, so as to optimize an arrangement cost and a repair rate for each of the two or more potential paths of the cable, the at least two levels of shielding provide different levels of protection for the cable; and determining, using the one or more processors and based on the jointly optimizing, the optimal laying paths for the cable, each of the optimal laying paths respectively including multiple path portions, the multiple path portions of a corresponding optimal path arrangement defining a shape of the corresponding optimal path arrangement and having the at least two levels of shielding such that the corresponding optimal path arrangement is a non-homogenous path arrangement with different levels of shielding for at least some of the path portions; and displaying, at a display operably connected with the one or more processors, at least one of the determined optimal laying paths on a map of the geographic terrain;

wherein the arrangement cost model incorporates a factor associated with location and level of shielding of the path, and can be represented as $H(\gamma,u(\cdot))=\int_0^{l(\gamma)} h(\gamma(s),u(s))ds$, where $H(\gamma,u(\cdot))$ is a laying cost of the cable, $h(\gamma(s),u(s))$ is a unit laying cost at location $\gamma(s)$ of the geographic terrain with a design level $u(s)$, and $l(\gamma)$ represents a total length of the cable;

wherein the repair rate model is represented as $G(\gamma,u(\cdot))=\int_0^{l(\gamma)} g(\gamma(s),u(s))ds$, where $G(\gamma,u(\cdot))$ is a total number of potential required repairs of the cable, $g(\gamma(s),u(s))$ is a potential required repair rate at the location $\gamma(s)$ of the geographic terrain with the design level $u(s)$, and $l(\gamma)$ represents the total length of the cable;

wherein the jointly optimizing comprises solving a single-objective optimization problem defined as min $\Phi'(\gamma,u(\cdot))=\int_0^{l(\gamma)}(h(\gamma(s),u(s))+c\cdot g(\gamma(s),u(s)))ds$, s,t,$\gamma$(0)=A and $\gamma(l(\gamma))$=B, where A and B are the two geographic locations, c is a weighing factor and $c \in R_4^1 \cup \{o\}$;

wherein the single-objective optimization problem can be transformed to an Eikonal equation and the solving comprises:
calculating a minimum weighted cost value over all of the levels of shielding for each of the grid points on the modelled geographic terrain; and
applying fast marching method to solve the Eikonal equation for determining the optimal laying paths;
wherein determining the optimal laying paths comprises determining a set of Pareto optimal solutions representing the optimal laying paths.

2. The computer-implemented method of claim 1, includes: local geographic attributes, labor, and licenses.

3. The computer-implemented method of claim 2, further comprising receiving input associated with the factors.

4. The computer-implemented method of claim 1, wherein the repair rate model is based on spatially distributed ground motion intensity associated with the geographic terrain in which the path is arranged.

5. The computer-implemented method of claim 4, wherein the spatially distributed ground motion intensity comprises peak ground velocity.

6. The computer-implemented method of claim 1, further comprising receiving input associated with dimensions of the grid points for modelling the geographic terrain.

7. The computer-implemented method of claim 1, further comprising receiving input associated with the two geographic locations.

8. The computer-implemented method of claim 1, wherein the repair rate model is based on spatially distributed ground motion intensity associated with the geographic terrain of each portion of a path and sums the repair rate per unit length of a path to determine a repair rate of the path.

9. The computer-implemented method of claim 1, wherein the at least two levels of shielding are provided by at least two of the following types of cable: single armoured cable, double armoured cable, and rock armoured cable.

10. The computer-implemented method of claim 1, wherein the cable is an optical cable.

11. An information handling system for determining optimal laying paths for a cable between two geographic locations, comprising:

one or more processors arranged to:
model a geographic terrain containing the two geographic locations, including modelling the geographic terrain into a grid with multiple grid points such that each of the grid points on the modelled geographic terrain is denoted by a respective 3D coordinate including an altitude of a corresponding geographic location of the geographic terrain;

jointly optimize two or more potential paths for the cable between the two geographic locations and at least two levels of shielding for the cable of each of the two or more potential paths of the cable, based on the modelled geographic terrain, an arrangement cost model that takes into account the at least two levels of shielding, and a repair rate model that takes into account the at least two levels of shielding, so as to optimize an arrangement cost and a repair rate for the cable of each of the two or more potential paths, the at least two levels of shielding for the cable provide different levels of protection for the cable; and determine, based on the joint optimization, the optimal laying paths for the cable, each of the optimal laying paths respectively including multiple path portions, the multiple path portions of a corresponding optimal path arrangement defining a shape of the corresponding optimal path arrangement and having the at least two levels of shielding such that the corresponding optimal path arrangement is a non-homogenous path arrangement with different levels of shielding for at least some of the path portions; and a display operably connected with the one or more processors and arranged to display at least one of the determined optimal laying paths on a map of the geographic terrain;

wherein the arrangement cost model incorporates a factor associated with location and level of shielding of the path for the cable, and can be represented as $H(\gamma,u(\cdot))=\int_0^{l(\gamma)} h(\gamma(s),u(s))ds$, where $H(\gamma,u(\cdot))$ is a laying cost of the cable, $h(\gamma(s),u(s))$ is a unit laying cost at location $y(s)$ of the geographic terrain with a design level $u(s)$, and $l(\gamma)$ represents a total length of the cable;

wherein the repair rate model is represented as $G(\gamma,u(\cdot))=\int_0^{l(\gamma)} g(\gamma(s),u(s))ds$, where $G(\gamma,u(\cdot))$ is a total number of potential required repairs of the cable, $g(\gamma(s),u(s))$ is a potential required repair rate at the location $y(s)$ of the geographic terrain with the design level $u(s)$, and $l(\gamma)$ represents the total length of the cable wherein the one or more processors are arranged to perform the joint optimization by solving a single-objective optimization problem defined as min $\Phi'(\gamma,u(\cdot))=\int_0^{l(\gamma)}(h(\gamma(s),u(s))+c\cdot g(\gamma(s),u(s)))ds$, s,t, $\gamma(0)=A$ and $\gamma(l(\gamma))=B$, where A and B are the two geographic locations, c is a weighing factor and $c \in R_4^1 \cup \{o\}$;

wherein the single-objective optimization problem can be transformed to an Eikonal equation, and the solving comprises, at least:

calculating a minimum weighted cost value over all of the levels of shielding for each of the grid points on the modelled geographic terrain; and applying fast marching method to solve the Eikonal equation for determining the optimal laying paths; and wherein the one or more processors are arranged to determine the optimal laying paths by, at least:

determining a set of Pareto optimal solutions representing the optimal laying paths.

12. The information handling system of claim 11, wherein the at least two levels of shielding are provided by at least two of the following types of cable: single armoured cable, double armoured cable, and rock armoured cable.

13. The information handling system of claim 11, wherein the cable is an optical cable.

* * * * *